(12) United States Patent
Jayaram et al.

(10) Patent No.: US 8,275,640 B2
(45) Date of Patent: Sep. 25, 2012

(54) INSURANCE QUOTING APPLICATION FOR HANDHELD DEVICE

(75) Inventors: Jaideep Jayaram, Flower Mound, TX (US); Nagraj V. Rao, Flower Mound, TX (US)

(73) Assignee: Webcetera, L.P., Flower Mound, TX (US)

( * ) Notice: Subject to any disclaimer, the term of this patent is extended or adjusted under 35 U.S.C. 154(b) by 175 days.

(21) Appl. No.: 12/841,242

(22) Filed: Jul. 22, 2010

(65) Prior Publication Data

US 2012/0022896 A1    Jan. 26, 2012

(51) Int. Cl.
*G06Q 40/00*    (2012.01)
(52) U.S. Cl. .......................................... 705/4
(58) Field of Classification Search ........................ 705/4
See application file for complete search history.

(56) References Cited

U.S. PATENT DOCUMENTS

| | | | |
|---|---|---|---|
| 5,797,134 A | 8/1998 | McMillan et al. | |
| 6,064,970 A | 5/2000 | McMillan et al. | |
| 6,868,386 B1 | 3/2005 | Henderson et al. | |
| 7,124,088 B2 | 10/2006 | Bauer et al. | |
| 7,542,915 B2 | 6/2009 | Kendrick | |
| 7,610,210 B2 | 10/2009 | Helitzer et al. | |
| 7,877,269 B2 | 1/2011 | Bauer et al. | |
| 8,019,629 B1 * | 9/2011 | Medina et al. | 705/4 |
| 8,090,598 B2 | 1/2012 | Bauer et al. | |
| 8,095,394 B2 | 1/2012 | Nowak et al. | |
| 2002/0173980 A1 | 11/2002 | Daggett et al. | |
| 2004/0039609 A1 | 2/2004 | Burkitt | |
| 2005/0125260 A1 | 6/2005 | Green et al. | |
| 2006/0036473 A1 | 2/2006 | Taylor | |
| 2007/0027726 A1 | 2/2007 | Warren et al. | |
| 2008/0294302 A1 | 11/2008 | Basir | |
| 2008/0312968 A1 * | 12/2008 | Hannon et al. | 705/4 |
| 2009/0006185 A1 * | 1/2009 | Stinson | 705/10 |
| 2009/0063174 A1 | 3/2009 | Fricke | |
| 2010/0174564 A1 * | 7/2010 | Stender et al. | 705/4 |
| 2011/0213628 A1 * | 9/2011 | Peak et al. | 705/4 |

OTHER PUBLICATIONS

Technology update, Anonymous, American Agent and Broker; Apr. 2000; 72, 4; ABI/INFORM Global, p. 99.*

* cited by examiner

*Primary Examiner* — Jagdish Patel
(74) *Attorney, Agent, or Firm* — James L. Baudino

(57) ABSTRACT

A method of providing location-based insurance rate quotes and a system for implementing that method. The method comprises determining a property address proximate a mobile electronic device based on global positioning system signals received by the mobile electronic device, prompting a user of the mobile electronic device to input a name, requesting a determination of insurable property affiliated with the property address and the name, requesting an insurance rate quote for the insurable property, and receiving and displaying the insurance rate quote on the mobile electronic device.

16 Claims, 3 Drawing Sheets

INSURANCE QUOTING APPLICATION FOR HANDHELD DEVICE

BACKGROUND

Independent insurance agents or insurance brokers generally provide consumers with an insurance premium estimate (a.k.a., an insurance rate quote) for a variety of types of insurable property (e.g., a home, a business, an automobile, a motorcycle, a boat, etc.). The amount of the insurance premium estimate is often based on a variety of factors. By way of example, these factors may include the type and condition of insurable property, an age of the insured, gender of the insured, marital status of the insured, deductible amount desired by the insured, policy limits desired by the insured, a credit score of the insured, and a geographic location of the insurable property.

BRIEF DESCRIPTION OF THE DRAWINGS

The accompanying drawings incorporated in and forming a part of the specification illustrate several aspects of the present disclosure and, together with the description, serve to explain the principles of the present disclosure. In the drawings.

DETAILED DESCRIPTION OF THE DRAWINGS

Figure 1:
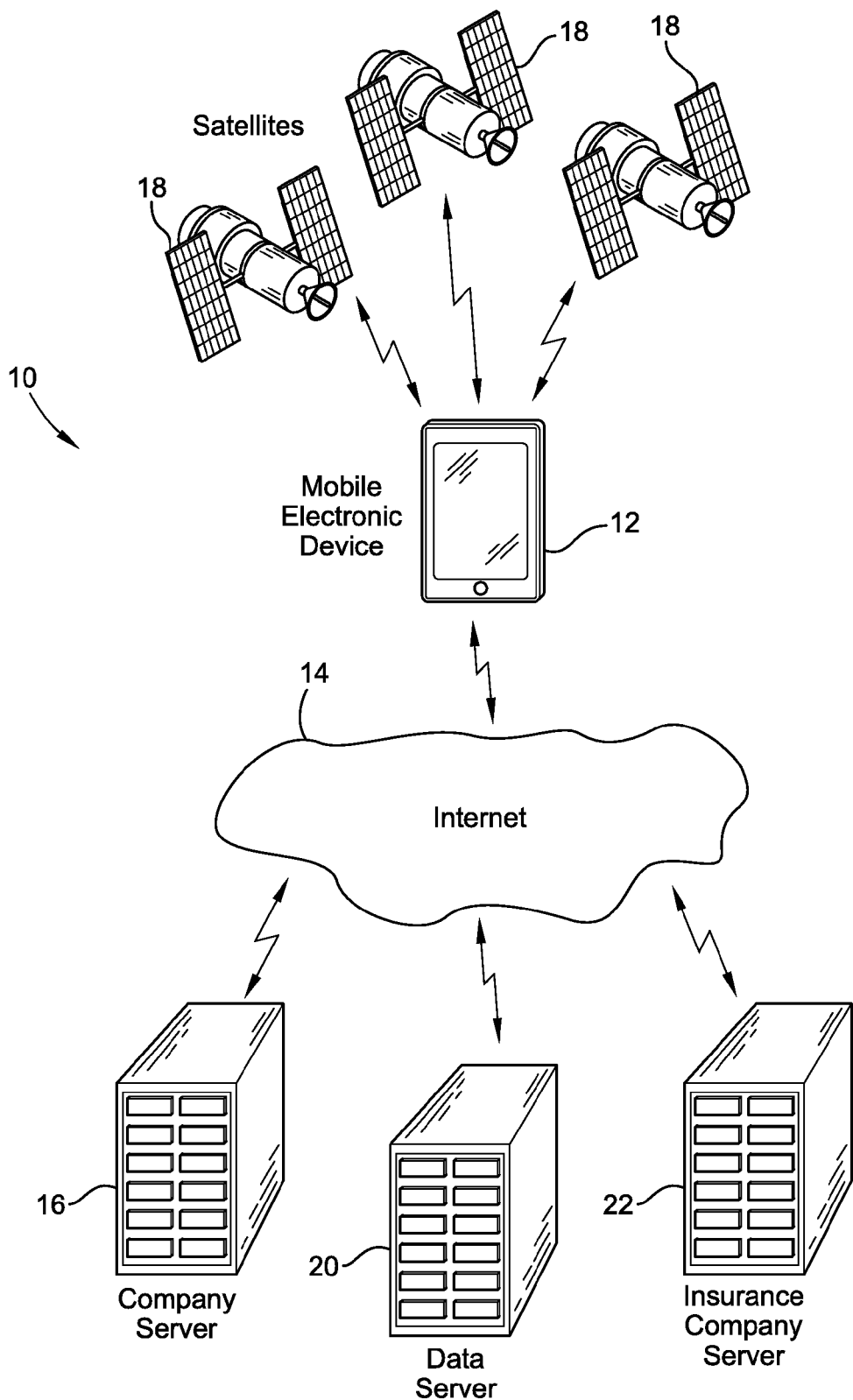
FIG. 1 is a schematic diagram illustrating an embodiment of a location-based insurance rate quote system.

Referring now to FIG. 1, an embodiment of an insurance rate quote system 10 for providing location-based insurance rate quotes is illustrated. As will be more fully explained below, system 10 enables a consumer desiring an insurance rate quote for a particular type of insurable property to launch a location-based insurance rate quote application, provide their name, and then receive location-based insurance rate quotes from insurance agents or others selling insurance products.

In the illustrated embodiment in FIG. 1, system 10 comprises a mobile electronic device 12 operably coupled through a network 14 to company server 16 and through satellite communication to global positioning system satellites 18. As shown, company server 16 is operably coupled through network 14 to a data server 20 and to an insurance company server, insurance agent server, or insurance broker server, which are collectively referred to for convenience as an insurance company server 22. While a single data server 20 and a single insurance company server 22 are illustrated in FIG. 1, additional data servers 20 and insurance company servers 22 may be present.

In FIG. 1, mobile electronic device 12 is a cell phone, smart phone, personal digital assistant (PDA), tablet computer, or similar mobile electronic device. In some embodiments, mobile electronic device 12 has dimensions consistent with the size of a typical user's hand to enable handheld use. The mobile electronic device 12 is Internet-ready and has an Internet browser installed thereon to permit browsing of the Internet. As will be more fully explained below, the mobile electronic device 12 is configured or adapted to run a location-based insurance rate quote application thereon.

In FIG. 1, network 14 is the Internet, which is a global system of interconnected networks that interchange data by packet switching using the standardized Internet Protocol Suite (TCP/IP). In some embodiments, network 14 may be another suitable network such as, for example, a wide area network (WAN), local area network (LAN), intranet, extranet, and the like or any combination thereof. Network 14 is configured to facilitate wireless communication, wired communication, or a combination thereof between mobile electronic device 12, company server 16, data server 20, and insurance company server 22.

In FIG. 1, company server 16 is a web server owned, operated, or controlled by a private company. In some embodiments, the private company is in the business of obtaining multiple insurance rate quotes for consumers. In some embodiments, the entity owing, operating, or controlling company server 16 is also the entity that created, owns, controls, sponsors or is otherwise affiliated with the location-based insurance rate quote application running or installed on mobile electronic device 12. In some embodiments, company server 16 is configured to receive requests through network 14 from mobile electronic device 12. In that regard, company server 16 may be equipped to accommodate data formatted as Hypertext Markup Language (HTML) and communicated using a standard communication protocol such as, for example, Hypertext Transfer Protocol (HTTP).

Company server 16 may be equipped for wireless communication, wired communication, or a combination thereof, over network 14. In some embodiments, company server 16 is a computing device other than, or in addition to, a web server. For example, company server 16 may be a desktop or laptop computer, a database server, or any other type of computing platform equipped with appropriate hardware and/or software. Also, while company server 16 is depicted in FIG. 1 as receiving requests from a single mobile electronic device 12, additional mobile electronic devices 12 may be present and accommodated by company server 16. Multiple company servers 16 may also be used.

In FIG. 1, data server 20 is a web server owned, operated, or controlled by a private company, a public company, a governmental entity (e.g., a municipality, county, state, etc.), and the like. In some embodiments, data server 20 is configured to receive requests through network 14 from company server 16. In that regard, data server 20 may be equipped to accommodate data formatted as Hypertext Markup Language (HTML) and communicated using a standard communication protocol such as, for example, Hypertext Transfer Protocol (HTTP).

Depending on the entity owning, operating, or controlling data server 20, in some embodiments data server 20 may have stored thereon, for example, property tax records, vehicle registration records, criminal and court records, corporate records, banking records, vital records, and the like. In some embodiments, data server 20 may have stored thereon a database of proprietary information compiled by an entity not associated or affiliated with company server 16. In other words, data server 20 is a third-party server relative to company server 16.

Data server 20 may be equipped for wireless communication, wired communication, or a combination thereof, over network 14. In some embodiments, data server 20 is a computing device other than, or in addition to, a web server. For example, data server 20 may be a desktop or laptop computer, a database server, or any other type of computing platform equipped with appropriate hardware and/or software. Also, while data server 20 is depicted in FIG. 1 as receiving requests from a single company server 16, additional company servers 16 may be present and accommodated by data server 20. Multiple data servers 20 may also be used.

In FIG. 1, insurance company server 22 is a web server owned, operated or controlled by an insurance agent, broker, or other individual or entity selling an insurance product. In some embodiments, insurance company server 22 is configured to receive requests through network 14 from company server 16. In that regard, insurance company server 22 may be equipped to accommodate data formatted as Hypertext Markup Language (HTML) and communicated using a standard communication protocol such as, for example, Hypertext Transfer Protocol (HTTP).

Insurance company server 22 may be equipped for wireless communication, wired communication, or a combination thereof, over network 14. In some embodiments, insurance company server 22 is a computing device other than, or in addition to, a web server. For example, insurance company server 22 may be a desktop or laptop computer, a database server, or any other type of computing platform equipped with appropriate hardware and/or software. Also, while insurance company server 22 is depicted in FIG. 1 as receiving requests from a single company server 16, additional company servers 16 may be present and accommodated by insurance company server 22. Multiple insurance company servers 22 may also be used.

In FIG. 1, insurance company server 22 is able to provide insurance rate quotes for insurable property to company server 16 upon request. In providing such rate quotes, insurance company server 22 may take into account a variety of parameters, characteristics and information such as, for example, the type and condition of insurable property, an age of the insured, gender of the insured, marital status of the insured, deductible amount desired by the insured, policy limits desired by the insured, a credit score of the insured, and a geographic location of the insurable property.

While company server 16 is depicted in FIG. 1 as receiving information from a single insurance company server 22, a plurality of additional insurance company servers 22 may be present and accommodated by company server 16. By requesting insurance rate quote information from a plurality of insurance company servers 16 of different companies, a plurality of different insurance rate quotes may be obtained by company server 16. In addition, while company server 16 is depicted in FIG. 1 as receiving information from a single data server 20, a plurality of additional data servers 20 may be present and accommodated by company server 16. By requesting data from a plurality of data servers 20 from different entities, the data may be verified, deemed more accurate, and the like.

Figure 2:
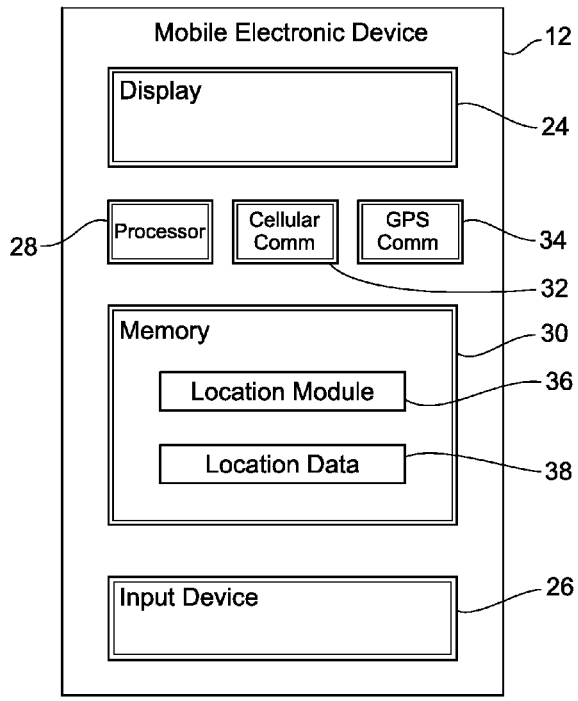
FIG. 2 is a block diagram illustrating an embodiment of a mobile electronic device in the insurance rate quote system of FIG. 1.

Referring now to FIG. 2, mobile electronic device 12 is illustrated in further detail. As shown, mobile electronic device 12 is equipped with a display 24 and an input device 26. Display 24 may be solely visual in nature or touch screen capable. In other words, display 24 may be equipped to simply display information to a user of the mobile electronic device 12 or to display and receive information from the user. In the illustrated embodiment of FIG. 2, the input device 26 is a physical keyboard. In some embodiments, input device 26 may be a touch screen keyboard, a mouse, trackball, stylus, a voice recognition application, and the like, operating alone or in conjunction with another input device 26. Input device 26 permits a user of mobile electronic device 12 to input certain information when prompted such as, for example, the user's name.

Still referring to FIG. 2, mobile electronic device 12 also includes a processor 28 and a memory 30. In general, processor 28 performs logic operations and processes and/or executes instructions (e.g., software code) that, when executed by processor 28, perform some or all of the features and steps described herein. Memory 30 temporarily or permanently stores data and information that may be retrieved therefrom.

Mobile electronic device 12 is equipped for wireless communication. In that regard, the mobile electronic device 12 includes wireless communication hardware 32 (e.g., a radio frequency transceiver, etc.) and applications permitting the transmission, receipt and processing of cellular or satellite frequency signals.

Mobile electronic device 12 is also equipped for global positioning system (GPS) communication with GPS satellites 18 of FIG. 1. In that regard, mobile electronic device 12 includes GPS hardware 34 (e.g., a GPS receiver, etc.) and associated applications. Based on the GPS signals received by mobile electronic device 12, a three-dimensional location (i.e., latitude, longitude, and altitude) of mobile electronic device 12 relative to the Earth and the current time can be determined.

Mobile electronic device 12 also includes a location module 36. Location module 36 functions to interface with GPS hardware 34 and/or GPS satellites 18 to obtain location data 38 (e.g., GPS coordinates, GPS signal information, etc.). In some embodiments, location module 36 functions to interface with a plurality of cellular towers (e.g., three or more cellular towers) to obtain location data 38 based on cellular triangulation. Location module 36 also functions to store and retrieve location data 38 to and from memory 30 and to transmit location data 38 to company server 16 with a request for a determination of the property address proximate mobile electronic device 12 based on the GPS signals and/or the cellular triangulation information received by mobile electronic device 12. In some embodiments, location module 36 is some combination of software, hardware, and/or firmware.

In some embodiments, location module 36 is configured to determine the property address proximate mobile electronic device 12 based on the location data 38. In some embodiments, location module 36 converts location data 38 (e.g., latitude and longitude coordinates) to a property address or otherwise associates the location data 38 with a property address. In some embodiments, location module 36 contacts and requests information from a third-party source (other than company server 16) to perform the conversion.

Figure 3:
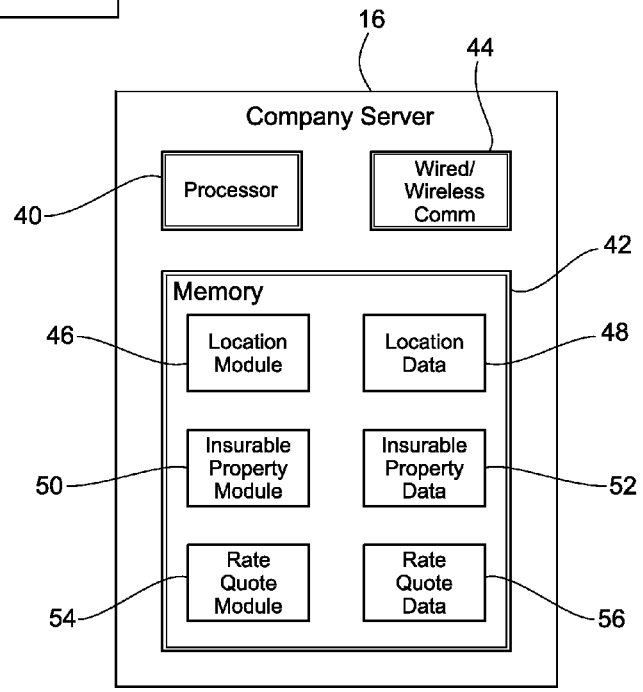
FIG. 3 is a block diagram illustrating an embodiment of a server in the insurance rate quote system of FIG. 1.

Referring now to FIG. 3, company server 16 is illustrated in further detail. Company server 16 includes a processor 40 and a memory 42. In general, processor 40 performs logic operations and processes and/or executes instructions (e.g., software code) that, when executed by processor 40, perform some or all of the features and steps described herein. Memory 42 temporarily or permanently stores data and information that may be retrieved therefrom. Company server 16 is equipped with hardware 44 (e.g., network hardware, a transceiver, etc.) for wired and/or wireless communication and applications permitting the transmission, receipt and processing of cellular and network signals.

Company server 16 also includes a location module 46. Location module 46 functions to interface with mobile electronic device 12 to obtain location data 48 (e.g., GPS coordinates, GPS signal information, etc.) and to store and retrieve location data 48 to and from memory 42. In some embodiments, location module 46 converts or translates location data 48 (e.g., latitude and longitude coordinates) into a property address or otherwise associates location data 48 with a property address. In some embodiments, location module 46 contacts and requests information from a third-party source to perform the conversion, translation or association. In some embodiments, location module 46 is some combination of software, hardware, and/or firmware.

In some embodiments, location module 46 is configured to receive a request from mobile electronic device 12 for a determination of the property address proximate mobile electronic device 12 based on the GPS signals received by mobile electronic device 12, to determine the property address proximate mobile electronic device 12 based on the GPS signals received by mobile electronic device 12, and transmit the property address to mobile electronic device 12.

Still referring to FIG. 3, company server 16 also includes an insurable property module 50. Insurable property module 50 functions to interface with data server 20 of FIG. 1 to obtain an inventory of insurable property affiliated or associated with the property address proximate mobile electronic device 12 and/or the name of the user of mobile electronic device. In some embodiments, insurable property module 50 is configured to transmit the inventory or determination of insurable property to mobile electronic device 12 for confirmation or verification by the user of mobile electronic device 12. Insurable property module 50 may store and retrieve insurable property and name data 52 in and from memory 42. In some embodiments, insurable property module 50 is some combination of software, hardware, and/or firmware.

In some embodiments, insurable property module 50 obtains the inventory of insurable property by culling information from property tax records, vehicle registration records, criminal and court records, corporate records, banking records, vital records, and the like, and combinations thereof. In some embodiments, the inventory of insurable property may be determined from a database of proprietary information compiled by an entity not associated or affiliated with company server 16 (e.g., a third-party server having proprietary information stored thereon).

Still referring to FIG. 3, company server 16 also includes a rate quote module 54. Rate quote module 54 functions to interface with insurance company server 22 or servers 22 to obtain an insurance rate quote or a plurality of insurance rate quotes. In some embodiments, rate quote module 54 prompts the user of mobile electronic device 12 to select a category of insurable property (e.g., home, automobile, motorcycle, boat, etc.) to limit the number of insurance rate quotes returned to mobile electronic device 12. In some embodiments, rate quote module 54 prompts the user of mobile electronic device 12 to input contact information permitting an insurance agent to contact the user regarding the insurance rate quote selected. Rate quote module 54 may store and retrieve the insurance rate quote data 56 in and from memory 42. In some embodiments, rate quote module 54 is some combination of software, hardware, and/or firmware.

In some embodiments, the various insurance rate quotes received from insurance company servers 22 can be processed or formatted by an algorithm being executed by processor 40 to provide better readability, to promote the ease of side-by-side comparison, to place the rate quotes and other information in a matrix for display, and the like. Upon obtaining the insurance rate quote or quotes from one or more insurance company servers 22, and after performing any optional processing or formatting, rate quote module 54 may transmit the insurance rate quote or quotes to mobile electronic device 12 for display on display 24.

Figure 4:
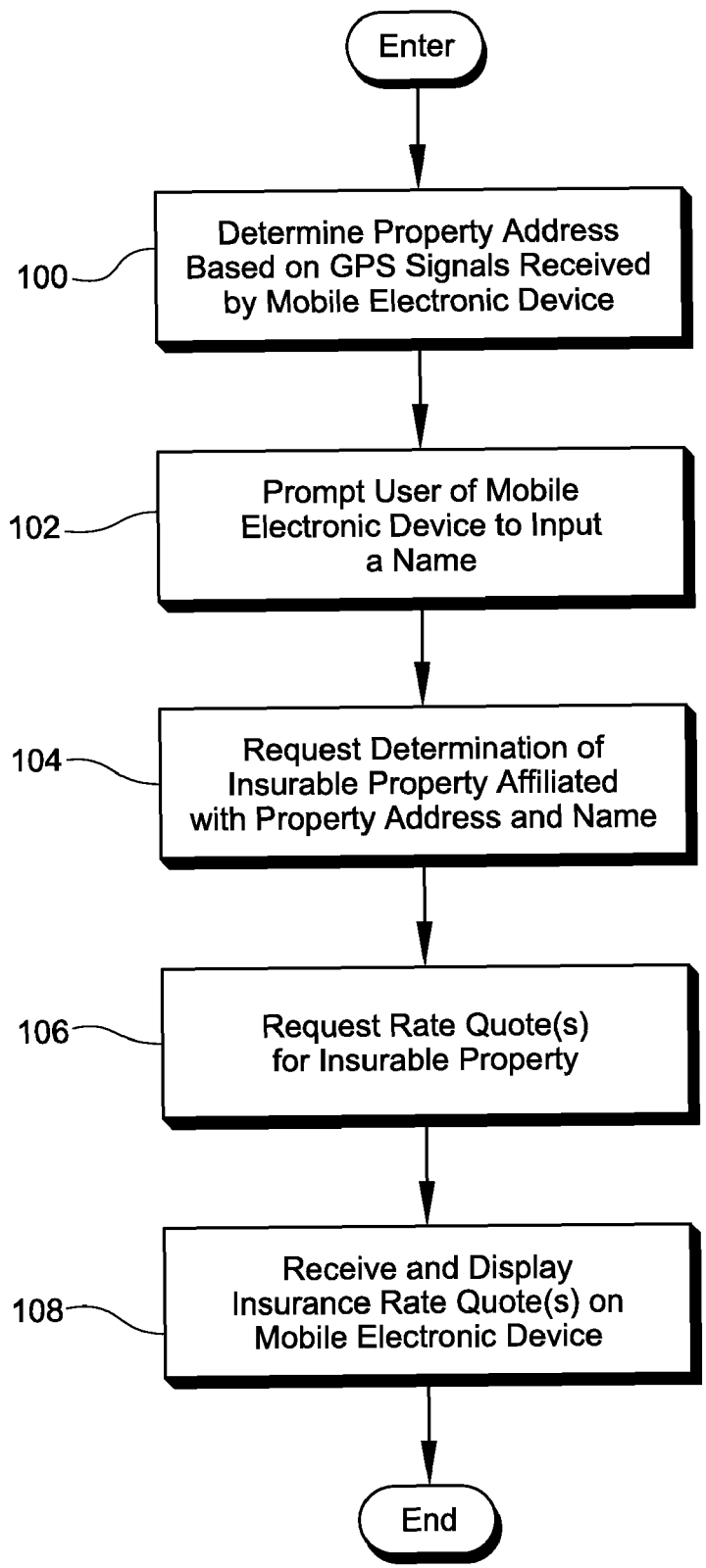
FIG. 4 is a flow diagram illustrating an embodiment of a method of providing location-based insurance rate quotes.

FIG. 4 is a flow diagram illustrating an embodiment of a method for obtaining location-based insurance rate quotes. At block 100, a property address proximate mobile electronic device 12 is determined based on global positioning system signals received by the mobile electronic device 12. In some embodiments, location module 36 of mobile electronic device 12 converts the GPS signals (e.g., latitude and longitude coordinates) received from GPS hardware 34 of mobile electronic device 12 into the property address. In some embodiments, mobile electronic device 12 requests through network 14 that location module 46 of company server 16 convert the GPS signals received from GPS hardware 34 of mobile electronic device 12 into the property address.

In some embodiments, the property address determined by location module 36 or location module 46 may be temporarily or permanently stored in memory 30 as location data 38 or in memory 42 as location data 48. In some embodiments, the property address is displayed on display 24 of mobile electronic device 12 and the user of mobile electronic device 12 is prompted to verify that the property address is correct. In some embodiments, the user of mobile electronic device 12 is prompted to verify that the user is in or proximate the users residence, dwelling, business or structure.

At block 102, a user of mobile electronic device 12 is prompted to enter a name (e.g., a last name, a first and last name, a last name and first initial, etc.). The user of mobile electronic device 12 is able to input the name using input device 26 or devices 26 of mobile electronic device 12. Once the name is received by mobile electronic device 12, at block 104 the mobile electronic device 12 requests through network 14 that insurable property module 50 of company server 16 determine the insurable property affiliated with the property address and the name.

After receiving the name and property address information, insurable property module 50 of company server 16 polls data server 20 and/or accesses information on data server 20 through network 14 to determine the insurable property (i.e., an inventory of the insurable property) affiliated with the property address and the name. In some embodiments, information on data server 20 that may be available to company server 16, directly or by request, may come from property tax records, vehicle registration records, criminal and court records, corporate records, banking records, vital records, and the like. In some embodiments, information on data server 20 that may be available to company server 16, directly or by request, may come from a database of proprietary information compiled by an entity not associated or affiliated with company server 16 (i.e., a third-party entity relative to the company owning, operating or controlling company server 16).

In some embodiments, the inventory of insurable property obtained by insurable property module 50 may be temporarily or permanently stored in memory 42 as insurable property and name data 52. In some embodiments, the insurable property is displayed on display 24 of mobile electronic device 12 and the user of mobile electronic device 12 is prompted to verify that the insurable property inventory is correct. In some embodiments, the user of mobile electronic device 12 may be prompted to input one or more characteristics of the insurable property.

After determining the insurable property affiliated with the property address and the name, at block 106 insurance rate quote module 54 of company server 16 makes a request through network 14 for an insurance rate quote for the insurable property from one or more insurance company servers 22. After the request, one or more insurance rate quotes are received by insurance rate quote module 54 of company server 16. In some embodiments, the insurance rate quotes obtained by insurance rate quote module 52 may be temporarily or permanently stored in memory 42 as quote data 56.

Once the insurance rate quotes are received by insurance rate quote module 54, company server 16 transmits the insurance rate quotes to the mobile electronic device 12 through network 14.

At block 108, the insurance rate quotes for the insurable property are received and displayed on mobile electronic device 12. Thereafter, the user of mobile electronic device 12 may be prompted to select a desired one of the insurance rate quotes. In some embodiments, the user is prompted to input contact information permitting an insurance agent to contact the user regarding the desired insurance rate quotes selected. The contact information can be, for example, a preferred phone number, electronic mail address, and the like. In some embodiments, the user may be prompted to select, prior to the request for the determination of insurable property, at least one category of insurable property in order to limit the plurality of insurance rate quotes eventually received and displayed.

It should be understood that in the described methods, certain functions may be omitted, accomplished in a sequence different from that depicted in FIG. 4, or simultaneously performed. Also, it should be understood that the method depicted in FIG. 4 may be altered to encompass any of the other features or aspects as described elsewhere in the specification. Further, embodiments may be implemented in software and can be adapted to run on different platforms and operating systems. In particular, functions implemented by location module 36, location module 46, insurable property module 50, and rate quote module 54, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

What is claimed is:

1. A method of providing location-based insurance rate quotes, comprising:
   determining, by a mobile electronic device, a property address proximate the mobile electronic device based on global positioning system signals received by the mobile electronic device;
   prompting a user of the mobile electronic device to input a name into the mobile electronic device to associate with a request for an insurance rate quote;
   transmitting, by the mobile electronic device over a network to a server, the request for the insurance rate quote, the request including the property address and the name for a determination of insurable property affiliated with the property address and the name;
   receiving from the server by the mobile electronic device an indication of an insurable property corresponding to the property address and the name; and
   receiving and displaying on the mobile electronic device a response received from the server including the insurance rate quote for the insurable property.

2. The method of claim 1, wherein the response received from the server includes a plurality of insurance rate quotes, and further comprising prompting the user of the mobile electronic device to select from the plurality of insurance rate quotes.

3. The method of claim 2, further comprising, in response to the user selecting one of the plurality of insurance rate quotes, prompting the user of the mobile electronic device to input contact information permitting an insurance agent to contact the user regarding the insurance rate quote selected.

4. The method of claim 1, further comprising requesting verification by the user of the mobile electronic device that the property address derived from the global positioning system signals is an address of a property to use for the insurance rate quote.

5. The method of claim 4, further comprising requesting verification by the user of the mobile electronic device that the indication of the insurable property received by the mobile electronic device is the insurable property to be used for the insurance rate quote.

6. The method of claim 1, further comprising requesting conversion of latitude and longitude coordinates received from a global positioning system receiver of the mobile electronic device into the property address.

7. The method of claim 1, further comprising prompting the user of the mobile electronic device to input one or more characteristics of the insurable property.

8. A computer readable medium tangibly embodying instructions which, when executed by a processor, implement a process comprising:
   determining, by a mobile electronic device, a property address proximate the mobile electronic device using based on global positioning system signals received by the mobile electronic device;
   prompting a user of the mobile electronic device to input a name into the mobile electronic device to associate with a request for one or more insurance rate quotes;
   transmitting, by the mobile electronic device over a network to a server, the request for the one or more insurance rate quotes, the request including the property address and the name for a determination of insurable property affiliated with the property address and the name;
   receiving from the server by the mobile electronic device an indication of an insurable property corresponding to the property address and the name; and
   receiving and displaying on the mobile electronic device a response received from the server including the one or more insurance rate quotes for the insurable property.

9. The computer readable medium of claim 8, wherein the instructions, when executed by the processor, further implement the process by prompting the user of the mobile electronic device to select from the one or more insurance rate quotes.

10. The computer readable medium of claim 9, wherein the instructions, when executed by the processor, further implement the process by, in response to the user selecting the one or more insurance rate quotes, prompting the user of the mobile electronic device to input contact information permitting an insurance agent to contact the user regarding the one or more insurance rate quotes selected.

11. The computer readable medium of claim 8, wherein the instructions, when executed by the processor, further implement the process by requesting verification by the user of the mobile electronic device that:
   the property address derived from the global positioning system signals is an address of a property to use for the insurance rate quote; and the indication of the insurable property received by the mobile electronic device is the insurable property to be used for the one or more insurance rate quotes.

12. The computer readable medium of claim 8, wherein the instructions, when executed by the processor, further implement the process by requesting conversion of latitude and longitude coordinates received from a global positioning system receiver of the mobile electronic device into the property address.

13. The computer readable medium of claim 8, wherein the instructions, when executed by the processor, further implement the process by prompting the user of the mobile electronic device to input one or more characteristics of the insurable property.

14. A location-based insurance rate quote system, comprising:
- a processor;
- a location module executable by the processor, the location module configured to receive a request for an insurance rate quote from a mobile electronic device, the request including a property address proximate the mobile electronic device and a name of a user of the mobile electronic device to associate with the insurance rate quote;
- an insurable property module executable by the processor, the insurable property module configured to determine insurable property affiliated with the property address and the name of the user of the mobile electronic device; and
- a rate quote module executable by the processor, the rate quote module configured to request the insurance rate quote for the insurable property from a plurality of insurance companies and to transmit the plurality of insurance rate quotes to the mobile electronic device for display thereon.

15. The system of claim 14, further comprising a memory operably coupled to the processor, the memory configured to store location data from the location module, insurable property and name data from the insurance property module, and insurance rate quote data from the rate quote module.

16. The system of claim 14, further comprising a memory having the location module, the insurable property module, and the rate quote module stored therein.

* * * * *